(12) United States Patent
Simonsen

(10) Patent No.: US 9,957,968 B2
(45) Date of Patent: May 1, 2018

(54) ROTATING OIL UNION WITH CENTERLINE MOUNTED DISPLACEMENT PROBE, SYSTEM FOR MEASURING DISPLACEMENT OF REGULATION SYSTEM OF VARIABLE PITCH AXIAL FAN AND METHOD THEREOF

(71) Applicant: HOWDEN DENMARK APS, Naestved (DK)

(72) Inventor: Jan Simonsen, Naestved (DK)

(73) Assignee: Howden Axial Fans ApS (DK)

( * ) Notice: Subject to any disclaimer, the term of this patent is extended or adjusted under 35 U.S.C. 154(b) by 290 days.

(21) Appl. No.: 14/774,751

(22) PCT Filed: Mar. 13, 2013

(86) PCT No.: PCT/EP2013/055110
§ 371 (c)(1),
(2) Date: Sep. 11, 2015

(87) PCT Pub. No.: WO2014/139560
PCT Pub. Date: Sep. 18, 2014

(65) Prior Publication Data
US 2016/0032933 A1  Feb. 4, 2016

(51) Int. Cl.
*F04D 29/36* (2006.01)
*F04D 27/00* (2006.01)
*F04D 25/04* (2006.01)

(52) U.S. Cl.
CPC ......... *F04D 27/001* (2013.01); *F04D 25/045* (2013.01); *F04D 27/002* (2013.01); *F04D 29/36* (2013.01)

(58) Field of Classification Search
CPC ...... F04D 19/02; F04D 29/329; F04D 29/362; F05D 2260/74; F05D 2270/64; F05D 2270/821
See application file for complete search history.

(56) References Cited

U.S. PATENT DOCUMENTS 4,221,541 A  *  9/1980  Bianchi ................. F04D 29/362
                                                   416/157 R
6,109,871 A  *  8/2000  Nelson ...................... F01P 7/06
                                                     123/41.49
(Continued)

FOREIGN PATENT DOCUMENTS

GB         2260821 A      4/1993
GB         2461784 A      1/2010
(Continued)

OTHER PUBLICATIONS

International Search Report and Written Opinion dated Dec. 10, 2013 for PCT/EP2013/05510 filed Mar. 13, 2013.

*Primary Examiner* — Ninh H Nguyen
(74) *Attorney, Agent, or Firm* — Edell, Shapiro & Finnan, LLC

(57) ABSTRACT

A system is disclosed for measuring displacement of a regulation system for a variable pitch axial fan. The system includes a hub having a plurality of adjustable pitch fan blades. A hydraulic cylinder is connected to the hub. A piston is disposed within the hydraulic cylinder. The piston is coupled to a piston shaft that is axially movable with respect to the hub. The piston shaft is coupled to an actuation assembly for adjusting the pitch of the plurality of adjustable pitch fan blades in response to an axial movement of the piston. A rotating oil union includes a housing and an interior element, the interior element coupled to the hydraulic cylinder so that rotation of the cylinder and the hub causes rotation of the interior element. The rotating oil union includes a static housing and a central probe fixed to the static housing. The central probe extends through respective openings in the interior element, the hydraulic cylinder, and the piston. The central probe is configured to sense an axial position of the piston and to generate a signal representative (Continued)

of said axial position. A method for using the system is also disclosed.

20 Claims, 7 Drawing Sheets

(56) References Cited

U.S. PATENT DOCUMENTS

| | | | | |
|---|---|---|---|---|
| 7,874,801 B2* | 1/2011 | Schmidt | ............... | F04D 27/001 |
| | | | | 416/156 |
| 2012/0263593 A1* | 10/2012 | McCallum | ............ | F04D 29/362 |
| | | | | 416/147 |

FOREIGN PATENT DOCUMENTS

| | | |
|---|---|---|
| JP | H05-202896 A | 8/1993 |
| JP | 2003021098 A | 1/2003 |
| JP | 2005-226609 A | 8/2005 |
| WO | 2011/072381 A2 | 6/2011 |

\* cited by examiner

ROTATING OIL UNION WITH CENTERLINE MOUNTED DISPLACEMENT PROBE, SYSTEM FOR MEASURING DISPLACEMENT OF REGULATION SYSTEM OF VARIABLE PITCH AXIAL FAN AND METHOD THEREOF

BACKGROUND OF THE INVENTION

Field of the Invention

Embodiments of the invention generally relate to variable pitch axial fans, and more particularly to a rotating oil union including a centerline mounted displacement probe for measuring displacement of the regulation system for variable pitch axial fan rotors.

Discussion of Related Art

Axial flow fans are known to include arrangements that enable external adjustment of the pitch of individual fan blades. Such "variable pitch" fans facilitate control of the airflow/fluegasflow through the fan, allowing system designers to meet a wide variety of operational requirements while minimizing losses attributable to non-adjustable fans.

Variable pitch fans typically include arrangements in which the individual fan blades are coupled to a rotating hub via a pivot assembly. Adjustment of blade pitch can be effectuated by a hydraulic actuation mechanism that rotates with the hub and the blades. At least a portion of the hydraulic actuation mechanism can also move longitudinally within the fan body. A distal portion of the actuation mechanism is coupled to the pivot assembly, which translating the axial displacement of the actuation mechanism into rotational movement of the individual blades.

As is known, the pitch of the blades of an axial-flow fan correspond to a specific position of the hydraulic actuation mechanism. Typically this position is measured external to the fan assembly using a mechanical position indicator. The customary method of measuring this displacement is to position monitors external to the rotor and to measure displacement relative to a stator (which is a static component). Such externally mounted position monitors suffer from problems including high mechanical hysteresis, which makes the mechanical system instable. This is due to the complex mechanical coupling systems employed. As a result, these systems require substantial maintenance to ensure proper long term operation.

In view of the above, an improved system is needed for providing accurate determination of, and control of, fan blade pitch during operation. Such a system should enable long term operation with minimal adjustment and repair.

SUMMARY OF THE DISCLOSURE

In view of the above noted shortcomings in the current state of the art, a system and method are disclosed for monitoring the position of a hydraulic cylinder position used for actuating/adjusting the blade pitch of a variable pitch fan to enable monitoring of in-flight fan blade position. The system and method include a rotating oil union that incorporates a displacement probe mounted along the fan's rotational centerline. In one embodiment, the rotating oil union includes off-center oil passages for transferring oil to and from the fan rotor. A displacement probe is mounted through the center of the rotating oil union. The probe extends through the hydraulic oil (i.e., the probe is subject to the pressurized oil) into the hydraulic cylinder for measuring axial displacement of the fan rotor. Although the oil union rotates with the hydraulic cylinder, the displacement probe is static, and is fastened to a static oil union flange. The probe is received in a measuring pocket formed in the hydraulic cylinder piston such that the hydraulic cylinder piston rotates around the static probe. The probe senses the position of the hydraulic cylinder, and sends a signal to a monitoring unit which decodes the signal and translates it into a determination of fan blade pitch.

A rotating oil union is disclosed for use in an axial flow fan. The union may include a housing, and an interior element rotatably coupled to the housing. The interior element may include a longitudinal bore. The union may also include a central probe, where a portion of the central probe may be disposed in the longitudinal bore. The longitudinal bore may be aligned along the central axis of the rotating oil union. The central probe may be configured to sense an axial position of a piston element disposed about a distal end portion of the central probe via inductive sensing.

A system is disclosed for measuring displacement of a regulation system for a variable pitch axial fan. The system may include a hub including a plurality of adjustable pitch fan blades. The system may also include a hydraulic cylinder connected to the hub, a piston and a rotating oil union. The piston may be disposed within the hydraulic cylinder, and may be coupled to a piston shaft. The piston may be axially movable with respect to the hub. The piston shaft may be coupled at one end to an actuation assembly for adjusting the pitch of the plurality of adjustable pitch fan blades in response to an axial movement of the piston. The rotating oil union having a housing and an interior element. The interior element may be coupled to the hydraulic cylinder so that rotation of the cylinder and the hub causes rotation of the interior element. The rotating oil union may further include a static housing and a central probe fixed to the static housing. The central probe may extend through respective openings in the interior element, the hydraulic cylinder, and the piston. The central probe may be configured to sense an axial position of the piston and to generate a signal representative of said axial position.

A method is disclosed for measuring displacement system of a regulation system for a variable pitch axial fan. The method includes: receiving, at a monitoring system, a signal from a central probe mounted in a rotating oil union, the signal representative of an axial position of a piston disposed about the central probe; and determining, at the monitoring system, a pitch of a plurality of fan blades. The pitch of the plurality of fan blades may be related to the axial position of the piston. The central probe may be mounted along a central axis of the variable pitch axial fan.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

Figure 1:
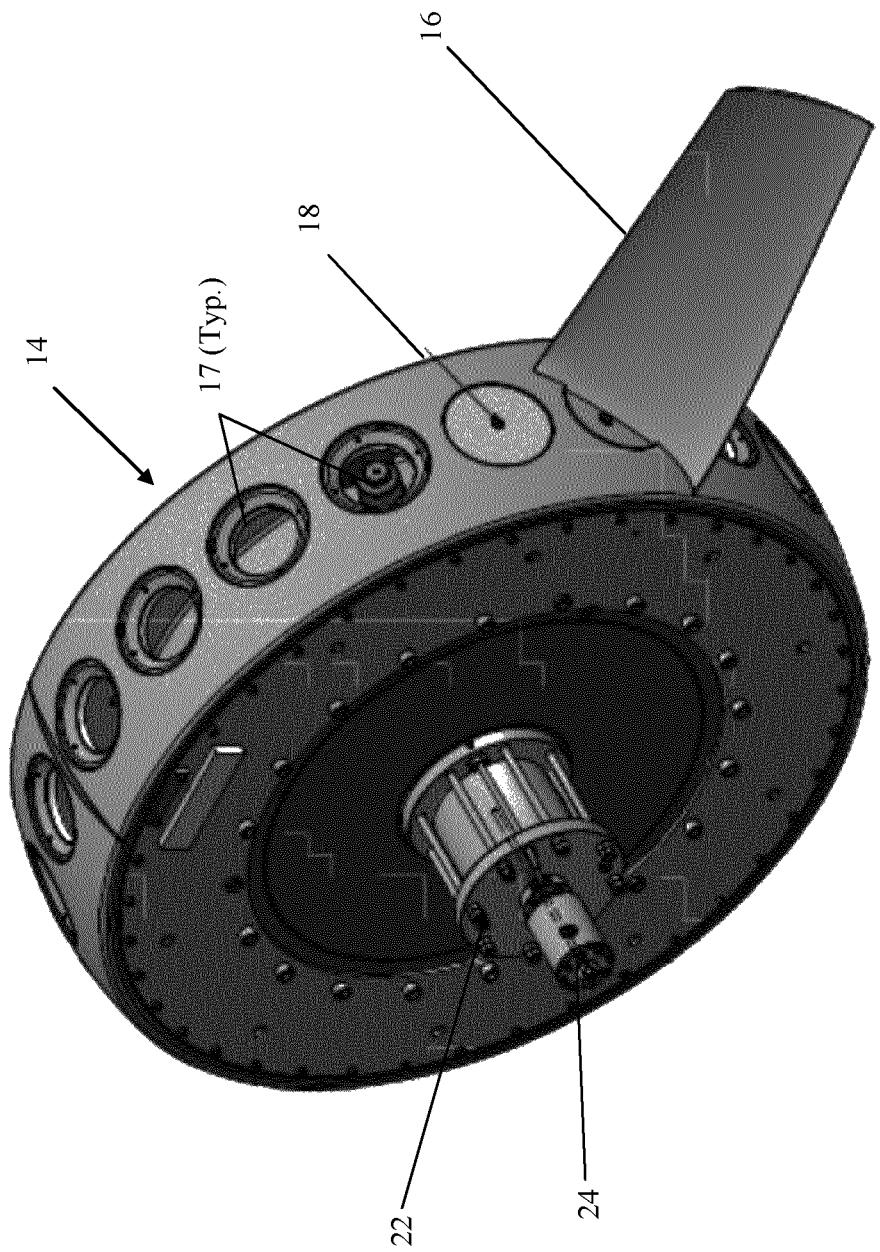
FIG. 1 is an isometric view of an exemplary hub portion of a fan system.

FIG. 1 is an isometric view of a hub 14 portion for use with a fan system. As can be seen, the hub 14 is generally spherical, and includes a plurality of openings 17 disposed about its outer perimeter for receiving a plurality of adjustable pitch fan blades 16 and blade bearings 18.

Figure 2:
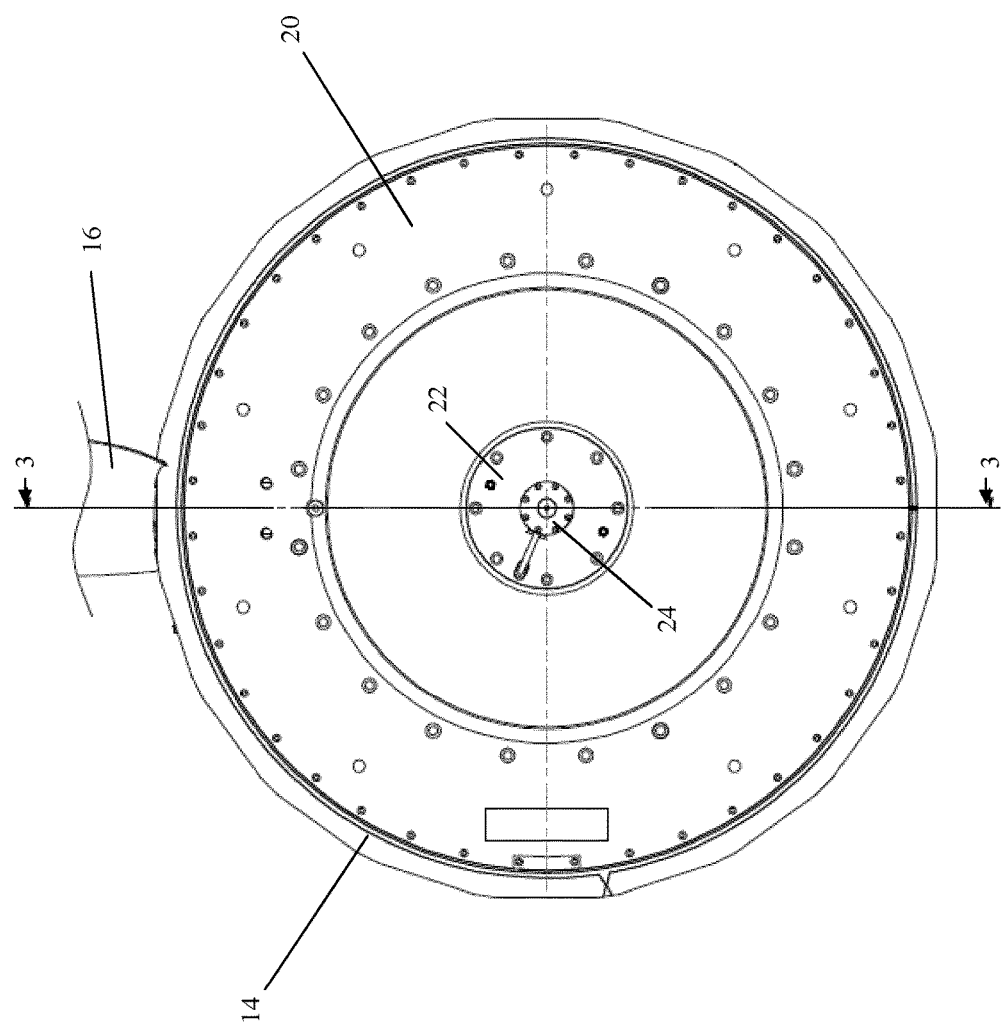
FIG. 2 is a front end view of the hub portion of FIG. 1.
Figure 3:
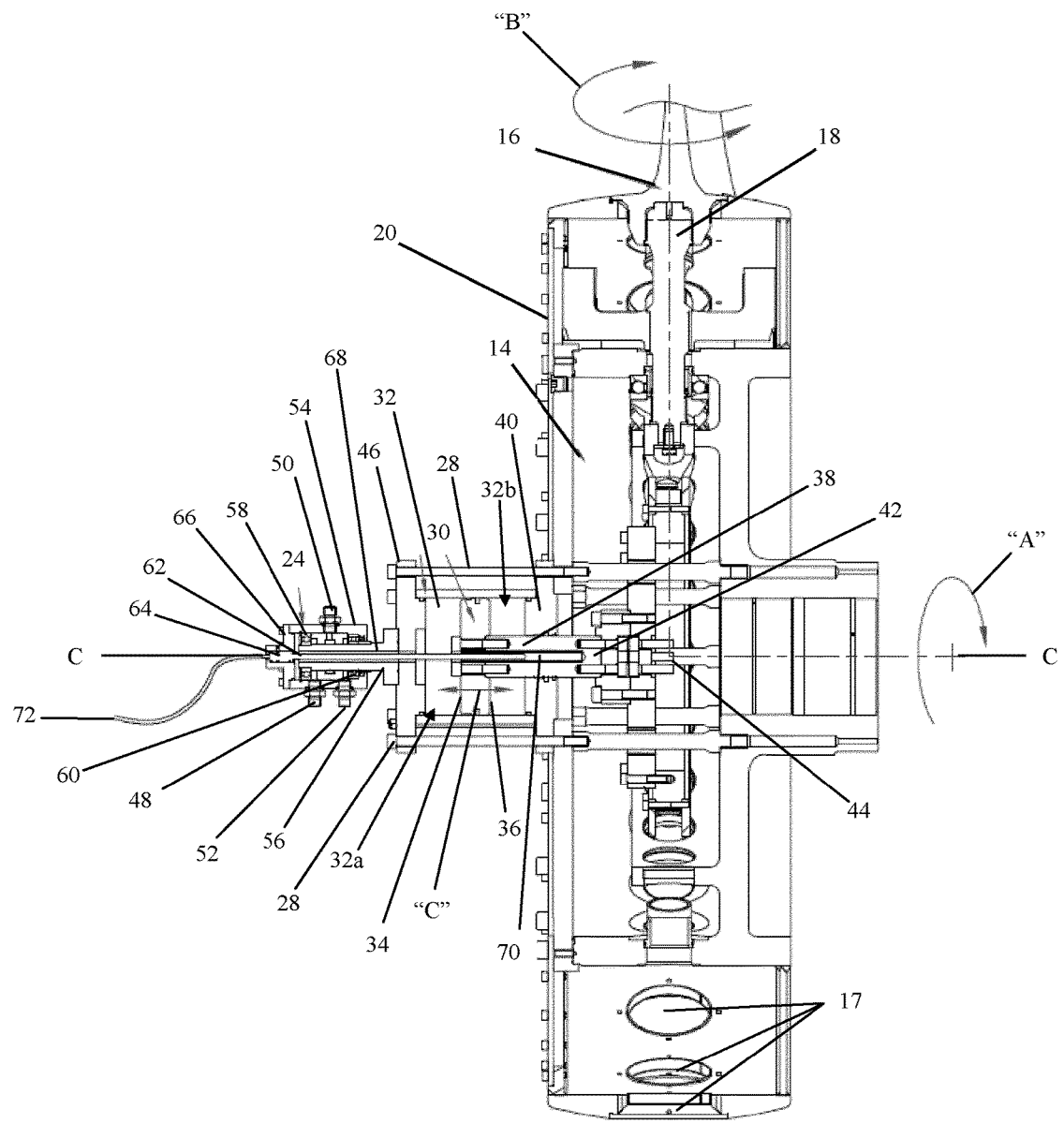
FIG. 3 is a cross-section view of the hub portion of FIG. 1, taken along line 3-3.

FIG. 2 is an end view of the hub 14 shown in FIG. 1. For clarity, the hub 14 is illustrated with a single blade 16. The hub 14 may have a front faceplate 20, coupled to which is a hydraulic cylinder 22 and an oil union 24. FIG. 3 shows the arrangement of the hub 14, fan blade 16, blade bearing 18 and hub faceplate 20. As arranged, the hub 14 rotates in the direction of arrow "A" about a shaft axis C-C. The fan blades 16 are rotatable in the direction of arrow "B" to enable pitch adjustments as described. Although a single fan blade 16 and blade bearing 18 are shown, it will be appreciated that the plurality of openings 17 disposed about the hub 14 are configured to receive additional fan blade and blade bearing units 16, 18.

The hydraulic cylinder 22 may be coupled to the faceplate 20 of the hub 14 via fasteners 28, and thus is configured to rotate along with the hub 14 in the direction of arrow "A." A hydraulic piston 30 may be disposed within a cylindrical interior portion 32 of the hydraulic cylinder 22 so that the piston 30 is axially movable within the cylinder along the direction of arrow "C," which in one embodiment is along the axis C-C. As will be appreciated, axial movement of the hydraulic piston 30 within the cylinder 22 can be accomplished through selective application of fluid pressure against the first or second side 34, 36 of the piston 30. In one embodiment, the fluid is oil, and the fluid pressure is applied to a first interior portion 32a to move the piston 30 toward the hub 14. Alternatively, to move the piston 30 away from the hub 14, fluid pressure can be applied to a second interior portion 32b of the hydraulic cylinder 22.

The piston 30 may be rotationally fixed with respect to the cylinder 22 so that the piston 30 rotates with the cylinder 22 and hub 14. The piston 30 may be coupled to a piston shaft 38 which is slidably received through respective openings in an end plate 40 of the hydraulic cylinder, and the hub 14. Appropriate seals may be provided between the piston shaft 38 and the openings in the cylinder end plate 40 and the hub 14 to prevent egress of fluid from the hydraulic cylinder 22.

A distal end 42 of the hydraulic piston 30 may be coupled to an actuation assembly 44 for translating the axial motion of the piston into rotational movement in the fan blades 16 and blade bearings 18 in a conventional manner. Thus arranged, by careful application of fluid pressure on the first or second side 34, 36 of the piston 30, fan blade pitch can be adjusted.

To provide a source of actuating fluid to the hydraulic cylinder 22, oil union 24 may be coupled to an endplate 46 of the hydraulic cylinder 22. The oil union 24 may include first and second oil inlets 48, 50 and an oil outlet 52 coupled to a housing portion 54 of the union 24. The housing portion 54 may be static and thus does not rotate with the cylinder 22, piston 30 and hub 14. As such, the oil inlets, outlets and housing portion are also static. Although not shown, the oil inlets and outlets may be coupled to a fluid control loop for controlling the fluid applied to the first and second interior portions 32a, b of the hydraulic cylinder 22.

The oil union can perform multiple functions, including delivering pressurized oil to facilitate a change in blade pitch. In addition, a small orifice (not shown) in the piston 30 allows a low pressure flow of oil to circulate through the hydraulic cylinder 22 and the oil union 24, to ensure that degenerated oil is removed from the oil union and cylinder in periods where regulation is not required and where no natural oil exchange in the system would otherwise take place. Both of these functions ensure lubrication of the oil union bearings.

The oil union 24 may also include an internal element 56 coupled to the end plate 46 of the hydraulic cylinder 22. As such, this internal element 56 rotates along with the cylinder 22, piston 30 and hub 14. The internal element 56 is rotatably coupled to the housing portion 54 of the rotating oil union 24 via first and second bearing sets 58, 60 so that the internal element 56 can rotate freely with respect to the static housing portion 54. A central probe 62 may be coupled at a first end 64 to a front flange 66 of the oil union 24. The central probe 62 may extend through a bore 68 in the internal element 56, through an opening in the end plate 46 of the hydraulic cylinder 22, through a bore in the hydraulic piston 30, and into a bore 70 in the piston shaft 38. Thus arranged, the hydraulic piston 30 can cycle axially along axis C-C with respect to the probe 62. The piston 30 can also rotate with respect to the probe. A communication link 72 is provided at the first end 64 of the probe 62 for providing a position feedback signal to a monitoring system (see FIG. 6.)

Figure 4:
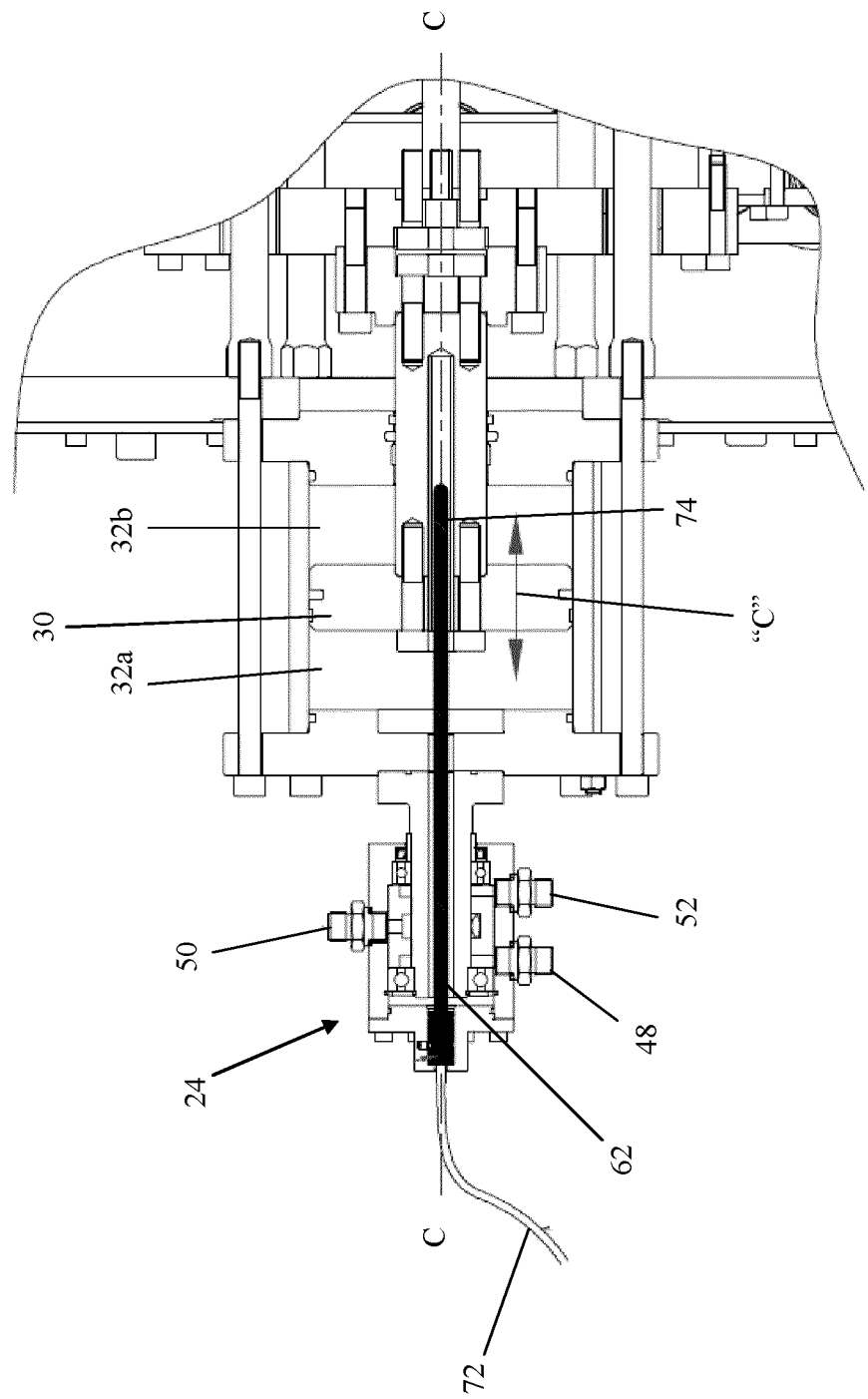
FIG. 4 is a detail view of an exemplary rotating oil union and displacement measurement arrangement for use with hub portion of FIG. 1.

Referring to FIG. 4, the oil union 24 and central probe 62 are shown in greater detail. As can be seen, the first end 64 of the central probe 62 is fixed to the front flange 66 of the oil union 24, thus fixing the probe axially and rotationally with respect to the housing portion 54 of the union. As previously noted, the hydraulic piston 30 is axially movable with respect to the hydraulic cylinder 22 (and thus with respect to the union and the probe). The hydraulic piston 22 also rotates along with the hub 14. A distal end 74 of the central probe 62 is received within a bore 70 of the piston shaft 38. During operation of the axial fan system, the central probe 62 remains fixed while the piston shaft 38 rotates and axially cycles with respect to the probe.

In one embodiment, the central probe 62 is an inductive sensing probe enclosed in an aluminum housing that generates a signal representative of the position of the rotating piston 30 along the length of the probe. One advantage to using an inductive sensing technique is that the electronics are encapsulated and provide a high degree of protection against dirt, dust and humidity, and as a result, the sensor can be used in extreme conditions. In general, the coil of an oscillating circuit associated with the probe generates a high-frequency electromagnetic alternating field. This field is emitted along the probe. The presence of attenuating material (i.e., piston 30) generates eddy currents and hysteresis, which draw energy from the oscillating circuit and reduce oscillation. A signal evaluator detects this reduction and converts it into a switching signal, which can be detected by a controller (see FIG. 6.) By calibrating this signal for a variety of known piston positions along the direction of arrow "C" the system can be calibrated for operation.

An advantage of having the probe 62 centrally mounted with respect to the rotational axis of the fan system, including the oil union 24, hydraulic cylinder 22, piston 30 and hub 14 is that highly accurate measurements can be obtained directly from the sensed position of the rotating piston. By carefully calibrating the sensor measurements, a highly accurate position of the piston can be determined, and the pitch of the fan blades can likewise be accurately determined. This compares very favorably to current "indirect"

methods for measuring position, which suffer from the problems previously described.

Figure 5:
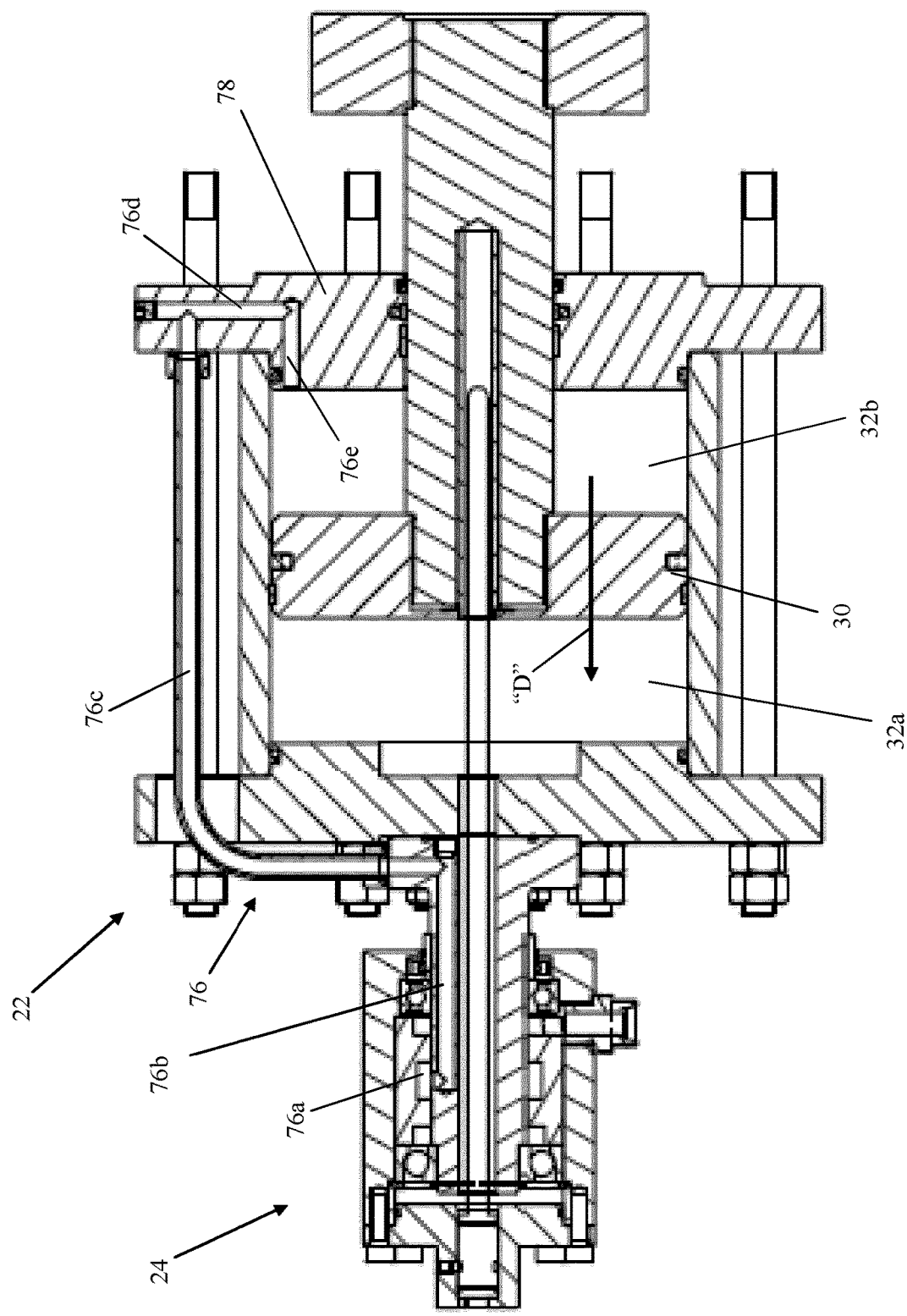
FIG. 5 is a further detail view of the oil union and displacement measurement arrangement for use with the system of FIG. 4.

Referring to FIG. 5, the oil supply features of the oil union 24 and hydraulic cylinder 22 will be described in greater detail. As described in relation to FIGS. 3 and 4, a pair of oil inlets 48, 50 and an oil drain 52 are coupled to the housing portion 54 of the union so that oil can be supplied to, and drained from, the interior of the union. As will be appreciated, this oil supply can be used to lubricate moving portions of the axial fan system. It can also be used to actuate the piston 30 (and thus, adjust the pitch of the fan blades 16) by selectively supplying the oil to the first or second interior portion 32a, 32b of the hydraulic cylinder 22. FIG. 5 shows a fluid path for supplying oil to the second interior portion 32b of the hydraulic cylinder, to move the piston 30 in the direction of arrow "D." Thus, oil may be supplied from an interior portion 76a of the union 24, through a longitudinal recess 76b in the internal element 56 of the union, through an external tube member 76c, and through respective radial and longitudinal openings 76d, 76e in a rear flange portion 78 of the cylinder 22. Oil supply (in/out) of the first interior portion 32a of the hydraulic cylinder is via oil inlet 48, past the first bearing set 58 and through the bore 68 in the internal element 56 of the union.

Figure 6:
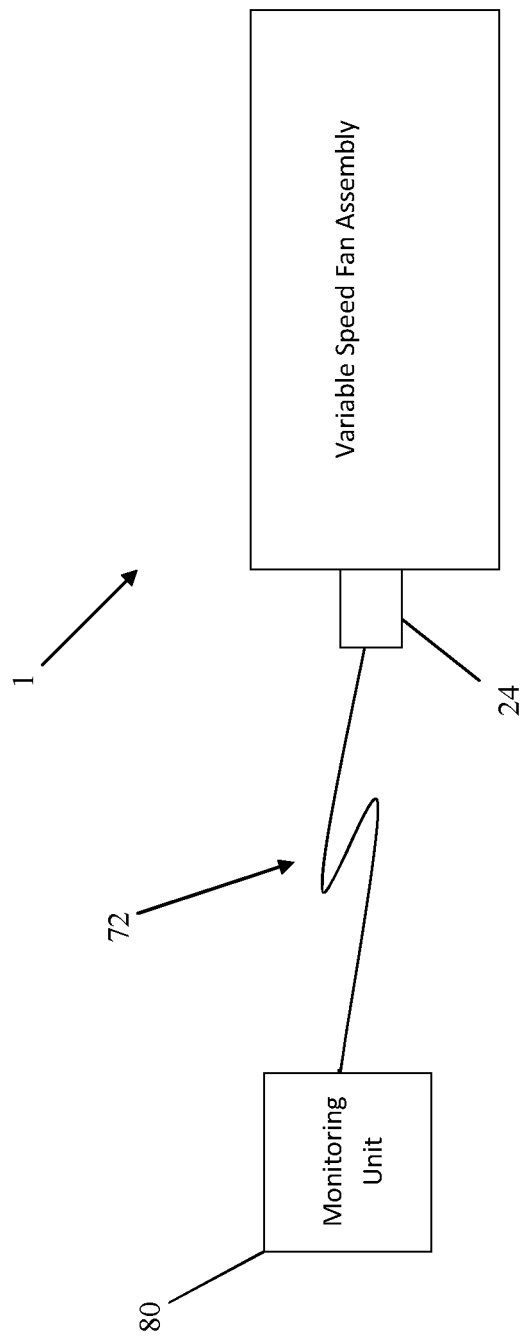
FIG. 6 is a schematic of a control and monitoring system for use with the hub portion of FIG. 1.

FIG. 6 shows a system for monitoring the pitch of a plurality of fan blades in a variable pitch axial fan system 1. The fan system may include a rotating oil union 24 as described in relation to FIGS. 2-5. A communication channel 72 may be provided to allow communication between the central probe 62 and a monitoring unit 80. The communication channel 72 may be any of a variety of hard wired or wireless connections. In one exemplary non-limiting embodiment, the central probe 62 produces a signal that can be received and decoded by the monitoring unit 80. The signal may be representative of an axial position of the piston 30 within the hub 14 of the axial fan system 1. In one embodiment, the monitoring unit 80 includes a processor executing instructions for determining a pitch of the plurality of fan blades 16 of the system based on received information from the central probe 62. The processor may be associated with memory for storing data representative of the fan blade pitch and/or the piston position. Monitoring of the system may be performed using a dedicated programmable logic controller (PLC). In one embodiment, the PLC may be used to control only the blade pitch. In another embodiment, the system can be monitored and controlled using an existing PLC that is used to control other plant functions. For either embodiment, an active feedback loop may be used that can provide constant re-evaluation of blade position and adjustment.

Figure 7:
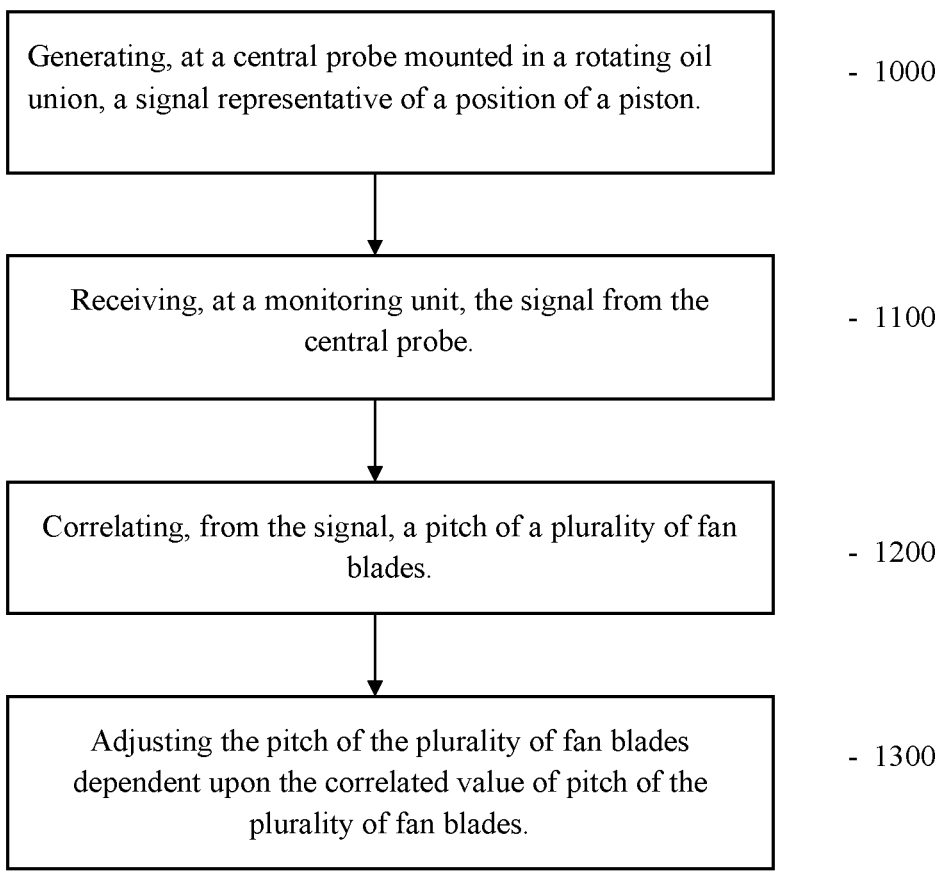
FIG. 7 is an exemplary logic flow illustrating an exemplary embodiment of the disclosed method.

FIG. 7 is an exemplary logic flow illustrating an embodiment of a method according to the disclosure. At step 1000, a signal is generated at a central probe mounted in a rotating oil union. The signal may be representative of a position of a piston. At step 1100, the signal is received at a monitoring unit. At step 1200, the pitch of a plurality of fan blades is correlated from the received signal. At step 1300, the pitch of the plurality of fan blades is adjusted dependent upon the correlated value of pitch of the plurality of fan blades. In some embodiments, the signal is an analog signal generated by the central probe, where the probe includes an inductive sensor. In other embodiments, adjusting the pitch of the plurality of fan blades is performed by applying fluid pressure to a first side of the piston.

In some embodiments, applying fluid pressure comprises supplying fluid via a rotatable fluid union coupled to a hydraulic cylinder, where the piston is reciprocally disposed within the hydraulic cylinder. The central probe may be coupled to the rotatable fluid union. The piston may include an opening for receiving a portion of the central probe so that the piston is rotatable with respect to the central probe. In some embodiments, the step of receiving comprises receiving an analog signal via a wired connection from the central probe.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

The invention claimed is:

1. A rotating oil union for use in an axial flow fan, comprising:
a housing;
an interior element rotatably coupled to the housing, the interior element including a longitudinal bore; and
a central probe, a portion of the central probe disposed in the longitudinal bore,
wherein the longitudinal bore is aligned along the central axis of the rotating oil union,
wherein the central probe is configured to sense an axial position of a piston element disposed about a distal end portion of the central probe via inductive sensing, and
wherein the piston element is configured to axially move relative to the distal end portion of the central probe.

2. The rotating oil union of claim 1, wherein the housing is rotationally fixed and the interior element is configured to rotate with the piston element.

3. The rotating oil union of claim 1, further including a communication channel coupled to the central probe for transmitting an analog signal representative of an axial position of said piston element with respect to said distal end portion of said central probe.

4. The rotating oil union of claim 1, further comprising a fluid inlet for introducing fluid into an interior portion of the housing and an oil drain for draining said fluid from the interior portion of the housing.

5. The rotating oil union of claim 4, wherein the interior element includes at least one fluid flow channel in communication with said fluid inlet for receiving fluid from said inlet and for directing said fluid through the interior element.

6. The rotating oil union of claim 1, wherein the interior element is coupled to the housing via a plurality of bearing units.

7. The rotating oil union of claim 1, the central probe comprising an elongated aluminum tube enclosing an inductive element therein.

8. A system for measuring displacement of a regulation system for a variable pitch axial fan, comprising:
a hub including a plurality of adjustable pitch fan blades;
a hydraulic cylinder connected to the hub;
a piston disposed within the hydraulic cylinder, the piston coupled to a piston shaft, the piston axially movable with respect to the hub, the piston shaft coupled at one end to an actuation assembly for adjusting the pitch of the plurality of adjustable pitch fan blades in response to an axial movement of the piston; and
a rotating oil union having a housing and an interior element, the interior element coupled to the hydraulic cylinder so that rotation of the cylinder and the hub causes rotation of the interior element, the rotating oil union further comprising a static housing and a central probe fixed to the static housing,
wherein the central probe extends through respective openings in the interior element, the hydraulic cylinder, and the piston,
wherein the central probe is configured to sense an axial position of the piston and to generate a signal representative of said axial position, and
wherein the piston is configured to axially move relative to a distal end portion of the central probe.

9. The system of claim 8, further including a communication channel coupled to the central probe for generating a signal representative of an axial position of said piston element with respect to said distal end portion of said central probe.

10. The system of claim 9, wherein the axial position of said piston element is representative of a pitch of said plurality of adjustable pitch fan blades.

11. The system of claim 8, further comprising a fluid inlet to said housing of said rotating oil union for introducing fluid into an interior portion of the housing and an oil drain for draining said fluid from the interior portion of the housing.

12. The system of claim 11, wherein the interior element includes at least one fluid flow channel in communication with said fluid inlet for receiving fluid from said inlet and for directing said fluid through the interior element.

13. The system of claim 8, wherein the interior element is rotatably coupled to the housing via a plurality of bearing units.

14. The system of claim 8, the central probe comprising an elongated aluminum tube enclosing an inductive element therein.

15. A method for measuring displacement system of a regulation system for a variable pitch axial fan, comprising:
receiving, at a monitoring system, a signal from a central probe mounted in a rotating oil union, the signal representative of an axial position of a piston disposed about the central probe; and
determining, at the monitoring system, a pitch of a plurality of fan blades,
wherein the pitch of the plurality of fan blades is related to the axial position of the piston,
wherein the central probe is mounted along a central axis of the variable pitch axial fan, and
wherein the piston is configured to axially move relative to a distal end portion of the central probe.

16. The method of claim 15, the signal comprising an analog signal generated by the central probe, wherein the probe includes an inductive sensor.

17. The method of claim 15, further comprising adjusting the axial position of the piston by applying fluid pressure to a first side of the piston.

18. The method of claim 17, wherein applying fluid pressure comprises supplying fluid via a rotatable fluid union coupled to a hydraulic cylinder, the piston reciprocally disposed within the hydraulic cylinder.

19. The method of claim 18, wherein the central probe coupled to the rotatable fluid union, the piston including an opening for receiving a portion of the central probe so that the piston is rotatable with respect to the central probe.

20. The method of claim 15, wherein the step of receiving comprises receiving an analog signal via a wired connection from the central probe.

\* \* \* \* \*